July 3, 1945.   H. P. STAUDINGER ET AL   2,379,760
MANUFACTURE OF ACETIC ACID
Filed July 15, 1942
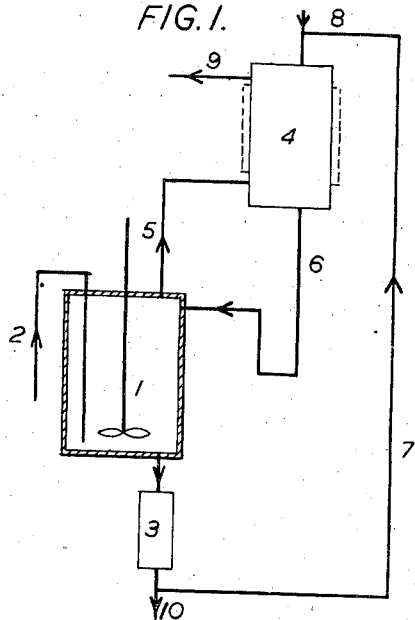
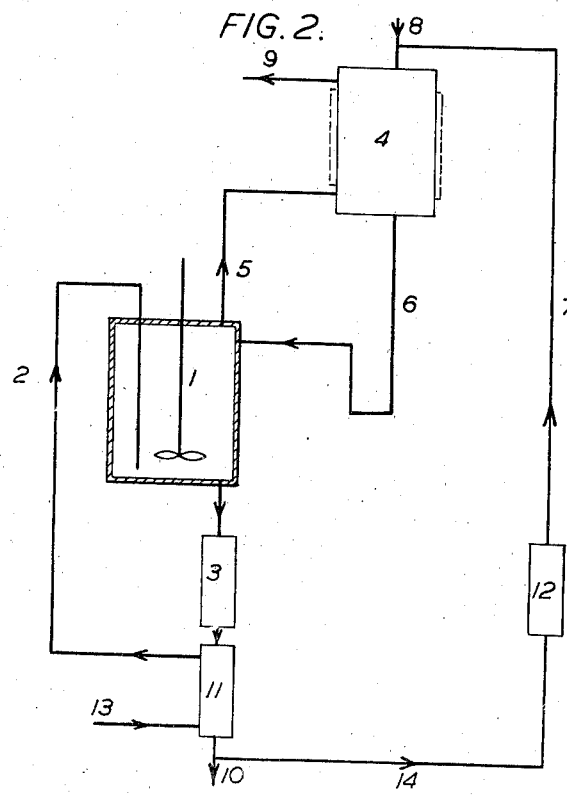
INVENTORS
HANNS PETER STAUDINGER
KARL H. W. TUERCK
BY ERIC HARVEY BRITTAIN
ATTORNEY Patented July 3, 1945

2,379,760

UNITED STATES PATENT OFFICE 2,379,760

MANUFACTURE OF ACETIC ACID

Hanns Peter Staudinger, Ewell, Karl Heinrich Walter Tuerck, Banstead, and Eric Harvey Brittain, Epsom Downs, England, assignors to The Distillers Company Limited, Edinburgh, Scotland, a company of Great Britain Application July 15, 1942, Serial No. 451,072
In Great Britain June 17, 1941

18 Claims. (Cl. 260—530)

Acetic acid is generally manufactured from acetaldehyde by passing mixtures of the latter with air or oxygen into a considerable quantity of preformed acetic acid. Catalysts may or may not be used in this reaction. The process has to be conducted continuously, acetic acid containing aldehyde being continuously withdrawn from the reaction vessel. A serious disadvantage of this process lies in the fact that a considerable proportion of the aldehyde passes through the acetic acid unchanged, and emerges with the effluent gas, from which it can be recovered only with considerable difficulty by scrubbing with acetic acid. This scrubbing plant forms the bulk of the equipment necessary for the above process. There is also the danger that the oxidation temperature may get out of control as the reaction between acetaldehyde and oxygen is very violent.

We have found that a number of the disadvantages of the process described above can be avoided in accordance with this invention by utilising paraldehyde as the raw material.

According to the present invention acetic acid is produced from paraldehyde by treating it in the presence of a depolymerising agent therefor directly with oxygen or oxygen-containing gases in the liquid phase at temperatures below 80° C. The nature and concentration of the depolymerising agent is so chosen that at the reaction temperature employed, a gradual depolymerisation of the paralydehyde takes place. Further, we have discovered that it is preferable, especially when air is used as the source of free oxygen, to control the rate of depolymerisation of paraldehyde so that it does not exceed substantially the rate of oxidation of the formed acetalydehyde to acetic acid. The depolymerisation of paraldehyde is a reversible reaction, and the equilibrium changes with change of temperature, the equilibrium concentration of acetaldehyde increasing with a rise of temperature.

A number of substances possess the power of depolymerising paraldehyde and these are chiefly of acidic character. We have found that the rates of depolymerisation brought about by unit concentrations at the same temperature of various acidic depolymerising agents which are active within the temperature limits of our process are, speaking very generally, proportional to their acid strength.

Under the temperature conditions of the process of our invention acetic acid exerts no depolymerising effect on paraldehyde. Trichloracetic acid, oxalic acid and boric acid cause a relatively low rate of depolymerisation, whilst the stronger acids and acidic salts, e. g. sulphuric acid, hydrochloric acid, or phosphoric acid and sulphonic acids cause higher rates of depolymerisation. In carrying out the process of our invention we may work at low temperatures, say 20°–50° C. and use active depolymerising agents for the depolymerisation, so that the equilibrium is almost established, or, especially at higher temperatures, we may use a less active depolymerisation agent or smaller concentrations thereof, so that the corresponding equilibrium concentration is not reached. In general the concentration of depolymerising agent should not exceed 5% by weight of the solution undergoing reaction. The value of a substance as a depolymerising agent can readily be determined by adding it to paraldehyde at a temperature suitable for the oxidation of acetaldehyde, and observing the rate at which acetaldehyde is produced.

Although it is possible to add solvents or diluents such as acetic acid according to our process these are not necessary and one of the advantages of our process lies in the fact that it is possible to oxidise pure paralyehyde or paraldehyde containing initially up to 10% by weight of acetic acid or other solvents. This means that if a batch process is employed, a much greater throughput per run can be achieved, as, if acetaldehyde is employed the initial concentration of acetaldeyhde in acetic acid cannot with safety exceed about 10%. It is also possible, according to our invention, to employ catalysts which are known to promote the oxidation of acetaldehyde to acetic acid, e. g. salts of copper, manganese or cobalt can be used. A special feature of our invention is the use of a substance, such as vanadic acid, which is both an agent for depolymerising paraldehyde and a catalyst for the oxidation of acetaldehyde to acetic acid. We have found that vanadic acid which has been "activated" by small amounts of acetic acid, water and/or hydrogen peroxide is an especially suitable depolymerising agent as well as an oxidation catalyst when employed at reaction temperatures above 50° C. preferably between 60° C. and 80° C. An active vanadic acid catalyst may also be prepared by treating vanadium pentoxide with oxygen in the presence of free acetaldehyde. It may also be employed together with a stronger depolymerising agent such as sulphuric acid, especially at lower temperatures.

A further advantage of our process is that explosive gaseous mixtures of acetaldehyde and air or oxygen can be avoided throughout the whole apparatus. Such gas mixtures have in the past been responsible for serious explosions.

As the quantity of acetaldehyde carried away by the effluent gas is much less in our process than hitherto, the size of the aldehyde recovery plant for a given output is considerably reduced. The plant required for batch operation is also considerably smaller. Further, since paraldehyde can be readily stored and transported whilst acetaldehyde is difficult to transport on account of its low boiling point, the present process offers a method of manufacturing acetic acid in small units of plant remote from the site of the acetaldehyde production plant. Previously this was not practicable.

The reaction may be carried out batchwise or continuously. As we have found, the reaction may be carried to completion with almost the same speed throughout i. e. the rate of reaction is independent of the concentration of paraldehyde or acetaldehyde.

We have further found that an advantageous method of carrying out the invention is to withdraw part of the reaction liquid from the reaction vessel and, after cooling it say to from 15° to 20° C., to use it for scrubbing the gases which leave the reaction vessel whilst using a catalyst, such as a vanadic acid, which does not cause polymerisation of acetaldehyde at the temperature in the scrubbing tower, and which only causes low concentrations of free acetaldehyde (below about 1.5%) to be present in the reaction mixture. Thus it is possible to wash back into the oxidation system so much of the acetaldehyde from the effluent gases that only a very small amount is carried away. If desired the reaction mixture, after cooling may be passed in counter-current to the oxygen or air before the latter enters the reaction vessel, so as to reduce still further the concentration of acetaldehyde in the reaction mixture before it enters the scrubbing tower and consequently the amount of acetaldehyde carried away by the effluent gas.

The reaction products may be worked up for recovery of acetic acid in any convenient manner. We may also carry out the recovery under conditions which do not involve depolymerisation of paraldehyde. If a strongly acidic catalyst, e. g. sulphuric acid has been employed as the depolymerising agent, this may be neutralised, for example, by means of sodium acetate or manganese acetate before distillation takes place. In the case of the more weakly acidic catalyst such as vanadic acid, depolymerisation of paraldehyde is prevented by carrying out the distillation at a temperature not in excess of about 50° C. by distillation under reduced pressure. By fractionating the mixture in this way a "heads" fraction consisting mainly of paraldehyde and acetic acid together with smaller amounts of acetaldehyde and water, if present, is obtained, acetic acid remaining as a liquid product. Water if present distils off as an azeotrope with paraldehyde containing 30% of water. At ordinary pressure this azeotrope boils at 89° C. and also contains about 30% of water.

*Example 1*

A mixture of 95.9 grams paraldehyde and 4.1 grams acetic acid was heated with oxygen at 70–77° C. for 3½ hours, while being vigorously stirred. No formation of acetic acid takes place, and the liquid contains practically no free acetaldehyde.

Under the same conditions a mixture of the same composition, but containing 0.5 g. vanadic acid which is partially dissolved, was oxidized. The absorption of oxygen starts immediately and after 2 hours a product containing more than 97% by weight acetic acid was obtained. The temperature remained constant at 72° C. during the oxidation process.

*Example 2*

Oxygen was introduced into 45 grams paraldehyde containing 0.1 g. sulphuric acid at a temperature of 31° C. 10.2 grams of acetic acid were formed per hour.

At the same temperature 100 grams of paraldehyde containing 0.2 g. vanadic acid and 0.02 g. sulphuric acid were treated with oxygen. After 4 hours, 92% by weight of the paraldehyde was found as 99% acetic acid in the reaction product.

If the reaction product contains substantial quantities of paraldehyde either because in the batch process the reaction is not carried out to completion or because the reaction is carried out by a continuous process, the paraldehyde can be separated from the acetic acid as a binary azeotrope with acetic acid and this mixture can then be returned to the oxidation stage. It is also possible to work up the oxidation product in the presence or absence of a depolymerising agent, by heating the mixture containing acetic acid and paraldehyde at a somewhat higher temperature under reflux, using a dephlegmator so regulated that only acetaldehyde distils over, the paraldehyde slowly depolymerising under these conditions. In this way it is possible to separate the acetaldehyde and paraldehyde from the acetic acid.

In order that the further examples may be more readily understood reference is made to the accompanying drawing in which:

Figure 1 is a diagrammatic sketch of one form of apparatus and

Figure 2 is a diagrammatic sketch of an alternative form of apparatus in which the process may be carried out.

*Example 3*

Into an oxidiser 1 (Figure 1) fitted with a stirring device and containing 19 kgs. of acetic acid, 1 kg. of paraldehyde and 2 gms. of vanadic acid, air is introduced through the pipe 2, the temperature being maintained at 60° C. The oxidiser 1 is fitted with conventional internal and/or external cooling means not shown in the drawing. Part of the solution is continuously withdrawn, cooled to 15° to 20° C. in the cooler 3, and is then led through pipe 7 into the top of the scrubbing column 4 which may be fitted with a conventional internal or external cooling device not shown in the drawing. The solution descends the column 4 in counter-current to the gases issuing from the oxidation vessel through pipe 5, and is returned from the base of the scrubbing column to the oxidiser through pipe 6. The effluent gases leave the scrubber 4 at pipe 9 and carry away about 28 grs. of acetaldehyde for every 520 grs. of acetaldehyde oxidized to acetic acid. Fresh paraldehyde and vanadic acid catalyst is continuously fed into the oxidiser 1 either directly or together with the cooled scrubbing liquid through pipe 8 into the top of the scrubbing column. It is of course also possible to use fresh paraldehyde to wash out further quantities of acetaldehyde from the effluent gases in a separate scrubbing column (not shown) the solution from this column being fed either into the scrubber 4 through pipe 8 or directly into the oxidizer 1. Cooled reaction mixture is withdrawn through pipe 10 for recovery of acetic acid, acetaldehyde and paraldehyde.

*Example 4*

A further modification of the process is now described with reference to Figure 2, in which reaction liquid from the oxidizer 1 is led into a cooler 3, where its temperature is reduced to a point at which no depolymerisation of paraldehyde takes place, preferably at 30° to 50° C. and then in a stripping column 11 where it flows in a downward direction in counter-current with an ascending stream of air, introduced through the pipe 13. This air serves to remove most of the acetaldehyde from the reaction solution which then passes through pipe 14 to the cooler 12 where the temperature is further reduced to 15° to 20° C. before entering the scrubbing column 4. Part of the reaction liquid issuing from the stripping column 11 is led through pipe 10 for recovery as before. The air, carrying acetaldehyde vapour, which issues from the top of the stripping column 11 flows through pipe 2 into the oxidizer 1. In this way the amount of acetaldehyde carried away with the effluent gas through pipe 9 is still further reduced.

As a further modification of the invention it is possible to use a packed tower in place of the oxidizer 1.

A particular advantage of this invention is that the depolymerisation of paraldehyde is an endothermic reaction and this counteracts the effect of the strongly exothermic acetaldehyde oxidation reaction thereby rendering the temperature control of the reaction a much easier matter.

What we claim is:

1. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C.; passing a gas containing molecular oxygen through said paraldehyde to oxidise the formed acetaldehyde therein and controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof.

2. A process according to claim 1 wherein the concentration of the depolymerising agent is less than 5% by weight of the reaction solution.

3. A process according to claim 1 wherein said paraldehyde initially contains not more than 10% by weight of an organic solvent.

4. A process according to claim 1 wherein said paraldehyde initially contains not more than 10% by weight of acetic acid.

5. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C. in the presence of an oxidation catalyst selected from the group consisting of compounds of copper, manganese and cobalt, passing a gas containing molecular oxygen through said paraldehyde to oxidise the formed acetaldehyde therein and controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof.

6. A process for the manufacture of acetic acid by the oxidation of acetaldehyde by means of molecular oxygen characterised by generating the acetaldehyde in situ by heating paraldehyde at a temperature below 80° C. with an acid of the oxygen carrier type adapted to effect depolymerisation thereof and to act as a catalyst for the oxidation of formed acetaldehyde, passing a gas containing molecular oxygen through said paraldehyde to oxidise the formed acetaldehyde therein and controlling the rate of depolymerisation by correspondingly adjusting the depolymerising temperature, the acidic strength of the said acid of the oxygen carrier type and the concentration of the latter so that acetaldehyde is formed at a rate not substantially in excess of the rate of oxidation thereof.

7. A process for the manufacture of acetic acid by the oxidation of acetaldehyde by means of molecular oxygen characterised by generating the acetaldehyde in situ by heating paraldehyde at a temperature below 80° C. with vanadic acid adapted to effect depolymerisation thereof and to act as a catalyst for the oxidation of formed acetaldehyde, passing a gas containing molecular oxygen through said paraldehyde to oxidise the formed acetaldehyde therein and controlling the rate of depolymerisation by correspondingly adjusting the depolymerising temperature and the concentration of the vanadic acid so that acetaldehyde is formed at a rate not substantially in excess of the rate of oxidation thereof.

8. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C. in the presence of an oxidation catalyst consisting of vanadic acid, passing a gas containing molecular oxygen through said paraldehyde to oxidise the formed acetaldehyde therein and controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof.

9. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C. in the presence of vanadium pentoxide, passing a gas containing molecular oxygen through said paraldehyde to convert said vanadium pentoxide to vanadic acid and thereby to form an oxidation catalyst in situ and continuing to pass molecular oxygen through the reaction mixture.

10. A process according to claim 8 wherein said vanadic acid is activated by treatment with acetic acid and water.

11. A process according to claim 8 wherein said vanadic acid is activated by treatment with acetic acid and hydrogen peroxide.

12. A process for the manufacture of acetic acid by the oxidation of acetaldehyde by means of molecular oxygen in the presence of vanadic acid as catalyst characterized by generating the acetaldehyde in situ by treating paraldehyde in a reaction vessel with an acidic substance which is more strongly acidic than said vanadic acid as a depolymerising agent therefor at a temperature below 80° C., passing a gas containing molecular oxygen through said paraldehyde to oxidise the formed acetaldehyde therein and controlling the rate of depolymerisation by correspondingly adjusting the depolymerising temperature and the concentration of the said acidic substance which is more strongly acidic than said vanadic acid so that acetaldehyde is formed at a rate not substantially in excess of the rate of oxidation thereof.

13. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C., passing a gas containing molecular oxygen through said paraldehyde to oxidise the formed acetaldehyde therein, controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof leading the effluent gases to a scrubber, feeding paraldehyde to said scrubber to wash out acetaldehyde from said effluent gases and leading the paraldehyde from the scrubber to the reaction vessel.

14. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C., passing a gas containing molecular oxygen through said paraldehyde to oxidise the formed acetaldehyde therein, controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof, withdrawing a portion of the reaction mixture from the reaction vessel, cooling said withdrawn reaction mixture to a temperature at which depolymerisation of paraldehyde substantially ceases and leading said cooled reaction mixture through a scrubber in countercurrent flow to the effluent gases from the reaction vessel and back to the reaction vessel.

15. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C., passing a gas containing molecular oxygen through said paraldehyde to oxidise the formed acetaldehyde therein, controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof, withdrawing a portion of the reaction mixture from the reaction vessel, cooling said withdrawn reaction mixture to a temperature at which depolymerisation of paraldehyde substantially ceases and the depolymerising agent can function as a polymerising agent for acetaldehyde and leading said cooled reaction mixture through a scrubber in countercurrent flow to the effluent gases from the reaction vessel and back to the reaction vessel.

16. A process for the manufacture of acetic acid by the oxidation of acetaldehyde by means of molecular oxygen characterised by generating the acetaldehyde in situ by treating paraldehyde in a reaction vessel with a depolymerising agent therefor at a temperature below 80° C., passing a gas containing molecular oxygen through said paraldehyde to oxidise the formed acetaldehyde therein, controlling the rate of depolymerisation by correspondingly adjusting the depolymerising temperature, the acidic strength of the depolymerising agent and the concentration of the latter so that acetaldehyde is formed at a rate not substantially in excess of the rate of oxidation thereof, withdrawing a portion of the reaction mixture from the reaction vessel, cooling said withdrawn reaction mixture to a temperature at which depolymerisation of paraldehyde substantially ceases passing said cooled reaction mixture through a stripping column in countercurrent to said gas containing molecular oxygen whereby it is stripped of free acetaldehyde, leading said gas from the stripping column to said reaction vessel and leading said stripped cooled reaction mixture through a scrubber in countercurrent flow to the effluent gases from the reaction vessel and back to the reaction vessel.

17. A process for the manufacture of acetic acid by the oxidation of acetaldehyde by means of molecular oxygen characterised by passing through paraldehyde in the presence of vanadic acid and acetic acid, at a temperature between 60° and 80° C., a gas containing molecular oxygen, to oxidise the acetaldehyde therein at a rate not substantially less than that at which paraldehyde is depolymerised, withdrawing a portion of the reaction mixture from the reaction vessel, cooling said withdrawn mixture to a temperature at which said vanadic acid is no longer active as a depolymerising agent and leading said cooled reaction mixture through a scrubber in countercurrent flow to the effluent gases from the reaction vessel and back to the reaction vessel.

18. A process for the manufacture of acetic acid by the oxidation of acetaldehyde by means of molecular oxygen characterised by passing through paraldehyde in the presence of vanadic acid and acetic acid at a temperature between 60° C. and 80° C., a gas containing molecular oxygen to oxidise acetaldehyde therein, at a rate not substantially less than that at which paraldehyde is depolymerised, withdrawing a portion of the reaction mixture from the reaction vessel, cooling said withdrawn mixture to a temperature of 30° to 50° C., passing said cooled reaction mixture through a stripping column in countercurrent to said gas containing molecular oxygen, whereby it is stripped of free acetaldehyde, leading said gas from the stripping column to said reaction vessel, and further cooling said stripped reaction mixture to a temperature below 20° C. and thereafter leading said cooled stripped reaction mixture through a scrubber in countercurrent flow to the effluent gases from the reaction vessel and back to the reaction vessel.

HANNS PETER STAUDINGER.
KARL HEINRICH WALTER TUERCK.
ERIC HARVEY BRITTAIN.